Feb. 14, 1939.   E. J. WENDER   2,147,623
SOUND FILM RECORDING SYSTEM
Filed June 26, 1937
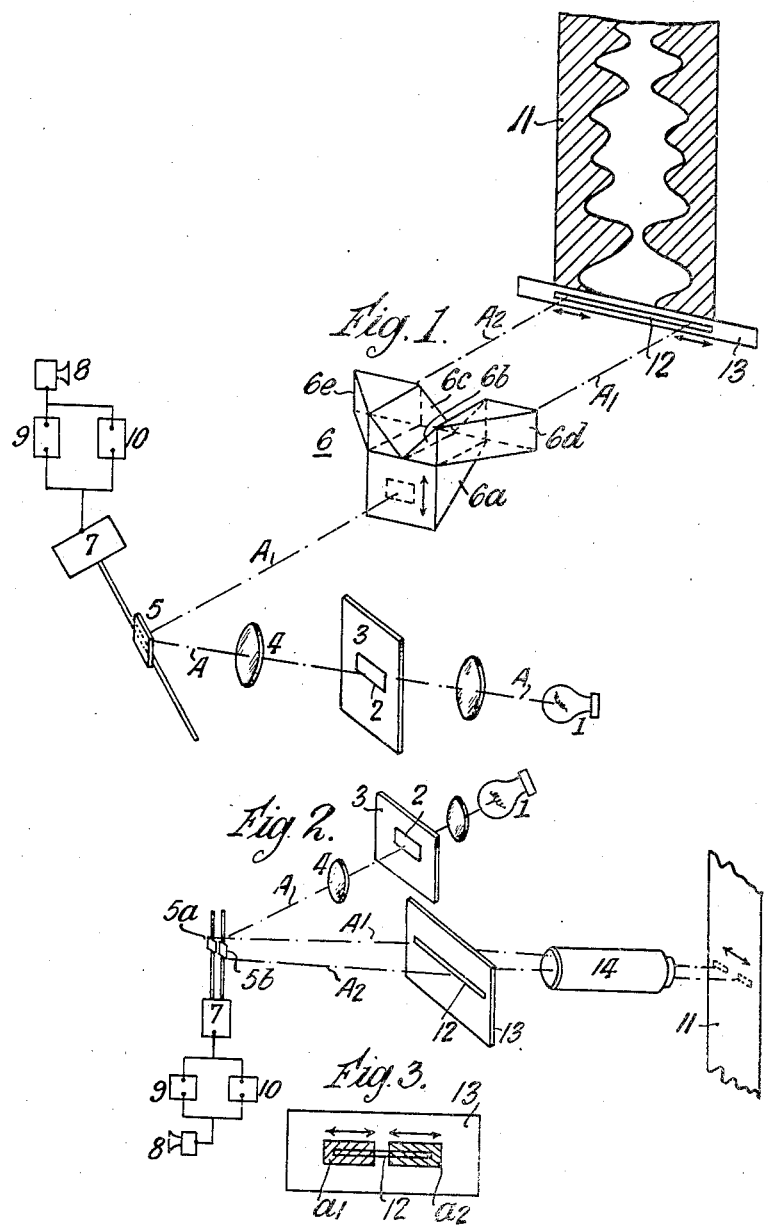

Patented Feb. 14, 1939

2,147,623

UNITED STATES PATENT OFFICE 2,147,623

SOUND FILM RECORDING SYSTEM

Eugene John Wender, London, England, assignor to British Ozaphane Limited, London, England, a company of Great Britain Application June 26, 1937, Serial No. 150,641
In Great Britain July 2, 1936

6 Claims. (Cl. 179—100.3)

This invention relates to sound film recording systems wherein sound is recorded by what is now well known as the variable area method (i. e., wherein sound is recorded photographically by acoustically varying the length of a narrow strip of light on the film in a direction at right angles to the direction of travel of the film) and more particularly to variable area sound recording systems of the now well known so-called "noiseless" or "silent recording" type.

According to this invention a method of effecting so-called "noiseless" variable area sound recording on a film consists in projecting upon said film a pair of light strips extending in the same straight line in a direction at right angles to the direction of motion of said film, the inner edges of said strips extending parallel to the direction of motion of the film and being spaced apart so as to constitute two "cutting" or "recording" edges said strips being moved similarly and simultaneously in opposite directions towards or away from one another in accordance with sound to be recorded and in accordance also with the mean strength or envelope of sound to be recorded.

The invention is illustrated in the accompanying drawing in which Fig. 1 shows schematically one apparatus for carrying out the invention;

Fig. 2 shows schematically a modification; and

Fig. 3 illustrates the method of recording of Figs. 1 and 2.

Referring to Fig. 1 light from a source represented by a filament 1 is projected through a rectangular or other parallel sided aperture 2 in a mask 3 and thence via a lens system 4 on to the moving mirror 5 of an oscillograph represented in part by the rectangle 7 whence the said light is reflected to a composite prism arrangement 6 or its equivalent, which divides the light beam into two, the prism arrangement being such that when movement of the light beam occurs due to actuation of the oscillograph the separated or divided light beams move equally in opposite directions. As shown the prism arrangement consists in effect of five totally reflecting prisms united together, the five totally reflecting faces being marked 6a, 6b, 6c, 6d and 6e. The light beams are represented by their centre lines (shown as chain lines) and it will be seen that the original single beam A is divided by the arrangement 6 into two, A1 and A2. The oscillograph is energised in accordance with sound signals to be recorded and also in accordance with the envelope wave of such sound signals. For example sounds picked up by a microphone 8 are converted into sound signals and, after amplification by an amplifier 9 fed to the oscillograph 7—5 to which is also fed a sound envelope wave obtained as known per se by a signal fed rectifier arrangement at 10. The apparatus 7, 8, 9, 10 is shown purely schematically as it is well known per se. The separated light beams A1 A2 are projected upon the film 11 through a narrow slit 12 in a mask 13 so that there is produced upon the film two narrow strips of light spaced a short distance apart and in the same straight line running transversely with respect to the direction of motion of the film. The innermost ends of these strips of light constitute the "cutting" or "recording" edges and the said innermost ends will approach one another or recede from one another in dependence both upon the sound and upon the sound envelope. The movements due to the sound and the sound envelope are represented by double headed arrows and the dotted rectangle shown on the prism arrangement represents an image of the aperture 2. The type of record obtained is conventionally indicated on the film.

In another modification of the invention represented schematically in Fig. 2 a double oscillograph, i. e. an oscillograph with two mirrors and two movements or two separate oscillographs is or are employed and a beam of light A is projected through a rectangular or other parallel sided aperture 2 in a mask 3 on to the two mirrors. In the figure a double oscillograph 7—5a—5b is represented, the two mirrors being represented by 5a and 5b. The oscillograph movements are so connected and energised from 9 and 10 that they move in opposite direction when energised by the same sound and sound envelope currents. If desired, and by means of any known electric filter means (not shown) in the energising circuits for the oscillograph movements each oscillograph movement may be made responsive only to a predetermined frequency range within the whole acoustic range to be handled, one oscillograph being responsive to one frequency range (a higher range) and the other oscillograph being responsive to another (a lower frequency range). The oscillograph movements are energised in dependence upon the sound wave to be recorded and also in dependence upon the envelope or average strength of said sound wave and the beams A1 A2 of light from the mirrors are projected via a slit 12 in a mask 13 and thence via an optical system 14 upon the film 11 so as to produce upon the said film two strips of light (represented by the broken line rectangles on the film) which move as in the embodiment of Fig. 1 i. e. as indicated by the double headed arrow. The actual recording is not represented on the film 11 shown in Fig. 2. The two oscillograph movements are both responsive to the whole frequency range and the record obtained will be of the nature shown on the film 11 in Fig. 1. That is to say the sound track recorded consists of a central unexposed portion (shown white in Figure 1) between recorded portions (shown shaded). In Figure 3 the mask 13 with the slot 12 is shown and on it is represented, by means of shaded areas $a1$ and $a2$, the acoustically vibrated light images obtained on the mask, part of the light in which proceeds through the slot 12 on to the film to perform the actual recording. For the sake of clarity these shaded areas are shaded in opposite directions. In Figure 3 the two areas $a1$, $a2$ vibrate oppositely as indicated by the arrows, the inner edges, which constitute the cutting edges never quite meeting and the outer edges never coming inward of the outer edges of the slot 12.

The invention is not limited to the particular apparatus or arrangements above described and optical arrangements other than those specifically described herein may be employed to carry out the method of the invention. The drawing is purely schematic and not intended to be to scale or in correct proportions.

What I claim is:

1. A method of effecting so-called "noiseless" variable area sound recording on a film, said method consisting in projecting upon said film a pair of light strips extending in the same straight line in a direction at right angles to the direction of motion of said film, the inner edges of said strips extending parallel to the direction of motion of the film and being spaced apart so as to constitute two "cutting" or "recording" edges, said strips being moved similarly and simultaneously in opposite directions towards or away from one another in accordance with sound to be recorded and in accordance also with the mean strength or envelope of sound to be recorded.

2. A method as claimed in claim 1 wherein the strips are obtained by projecting upon a mask having a slit therein, two illuminated areas, said mask cutting off all light except that which passes through the slit, the light so passed proceeding to the film to provide the said strips and the said slit being transverse with respect to the direction of motion of the film.

3. Apparatus for effecting so-called "noiseless" variable area sound recording on a film, comprising a source of light; means for directing upon said film a pair of light strips extending in the same straight line in a direction at right angles to the direction of motion of the film and with the inner edges of said strips extending parallel to the direction of motion of the film and being spaced apart to constitute two "cutting" or "recording" edges; an oscillograph associated with said light-directing means for actuating the latter to effect movement of the two light strips similarly and simultaneously in opposite directions towards or away from each other; and means for operating said oscillograph in accordance with sound to be recorded and in accordance also with the mean strength or envelope of sound to be recorded, the means for directing the light upon the film including a composite prism or equivalent optical means which divides a light beam from said source into two portions for forming said light strips.

4. Apparatus for effecting so-called "noiseless" variable area sound recording on a film, comprising a source of light; means for directing upon said film a pair of light strips extending in the same straight line in a direction at right angles to the direction of motion of the film and with the inner edges of said strips extending parallel to the direction of motion of the film and being spaced apart to constitute two "cutting" or "recording" edges; an oscillograph means having two light-directing parts movingly responsive equally and oppositely by the same signal energization of the oscillograph means for effecting movement of the two light strips similarly and simultaneously in opposite directions towards and away from each other; and means for energizing said oscillograph means in accordance with sound to be recorded and in accordance also with the mean strength or envelope of sound to be recorded.

5. The method of effecting variable area sound recording on a film said method including projecting upon said film a pair of light strips extending in the same straight line in a direction at right angles to the direction of motion of said film, the inner edges of said strips being spaced apart and constituting two "cutting" or "recording" edges, and moving said strips in opposite directions in accordance with sound to be recorded and in accordance also with the mean strength or envelope of sound to be recorded, said strips being projected on to the film by means including a source of light and two oscillograph movements equally and oppositely responsive to the same signals.

6. The invention set forth in claim 1 characterized in that the strips are moved oppositely one in response to higher and the other in response to lower frequency signals.

EUGENE JOHN WENDER.